A. TOKHEIM.
TIRE SHIELD AND CLENCHER IRONS THEREFOR.
APPLICATION FILED MAR. 25, 1920.
1,399,826. Patented Dec. 13, 1921.
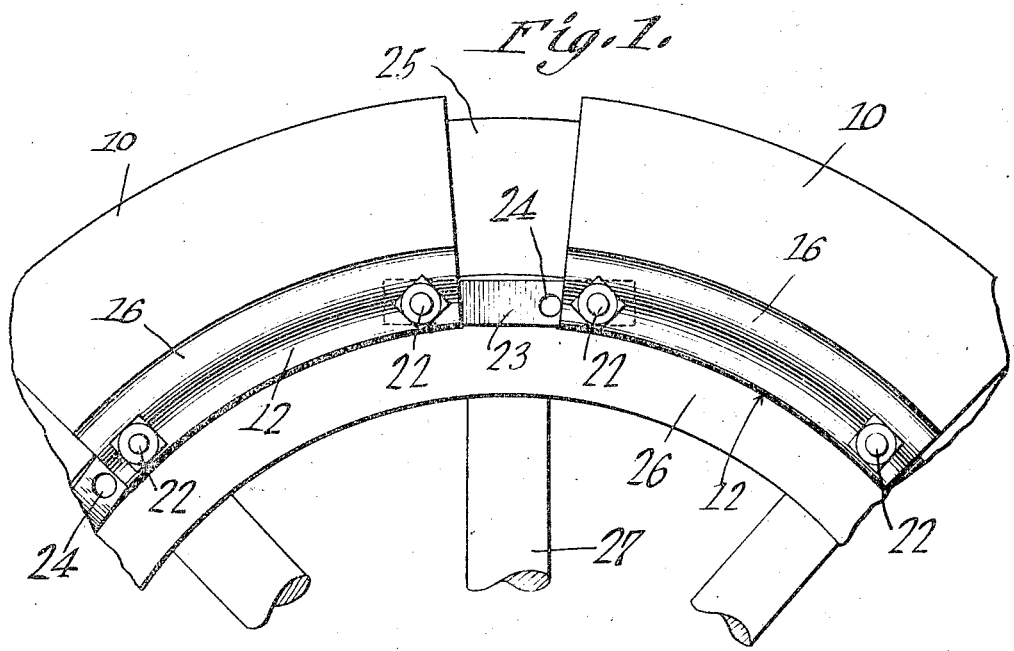
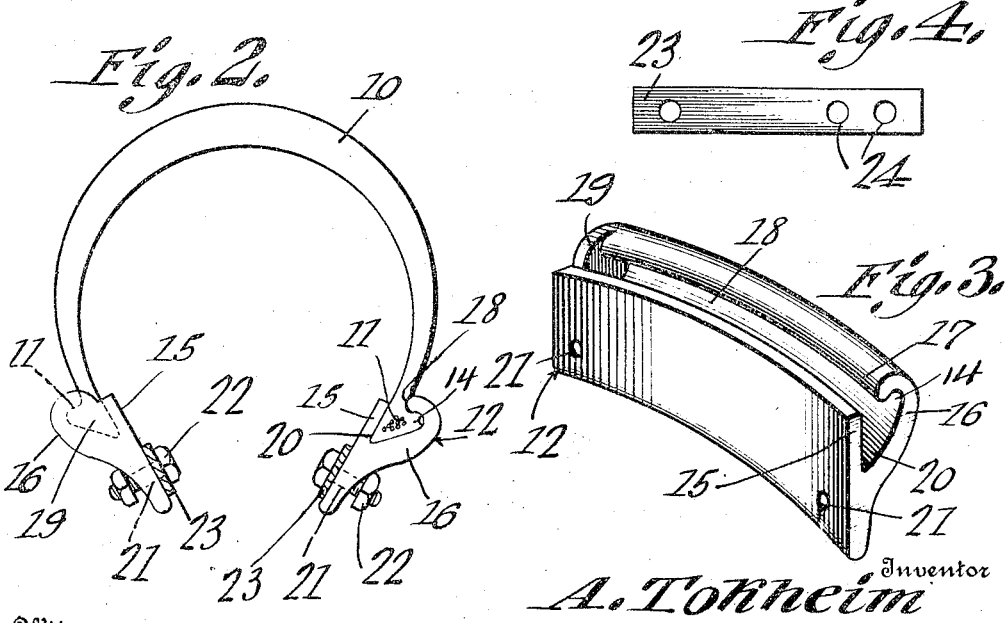
Inventor
A. Tokheim

UNITED STATES PATENT OFFICE.

ALBERT TOKHEIM, OF THOR, IOWA.

TIRE-SHIELD AND CLENCHER-IRONS THEREFOR.

1,399,826.

Specification of Letters Patent. Patented Dec. 13, 1921.

Application filed March 25, 1920. Serial No. 368,555.

*To all whom it may concern:*

Be it known that I, ALBERT TOKHEIM, a citizen of the United States, residing at Thor, in the county of Humboldt and State of Iowa, have invented a new and useful Tire-Shield and Clencher-Irons Therefor, of which the following is a specification.

This invention relates to the class of pneumatic tires, and more particularly to an improved tire shield or anti-skid and anti-wear armor, and clencher irons or retaining means therefor, the object of the invention being to make use of automobile tire casings or shoes after the same are no longer strong enough to withstand air pressure, the device comprehending the use of the worn casings by cutting the same into sections of equal lengths, preferably eight in number for each tire, novel means being provided for mounting the same in position as well as connecting and retaining them against displacement and to take up wear and tear so as to save the new tire casings in addition to producing more efficient traction between the tire and the road.

A further object of the invention is to provide an improved tire shield embodying a plurality of sections arranged in spaced relation on a tire so as to allow mud or water that may enter the same, to escape or fall out, and novel means for receiving the clencher portions of the tire casing sections of the shield and for adjustably connecting the same whereby they may be readily applied and adjusted to tires slightly varying in size.

With the above and other objects in view which will appear as the description proceeds, the invention resides in the combination and arrangement of parts and in the details of construction hereinafter described and claimed, it being understood that within the scope of what is claimed, changes in the precise embodiment of the invention shown can be made without departing from the spirit of the invention.

In the accompanying drawings:

Figure 1 is a fragmentary side elevation of a tire having the improved shield applied thereto;

Fig. 2 is an end elevation of one of the sections of the shield;

Fig. 3 is a perspective view of one of the clencher irons or retaining devices for mounting the sections of the shield on the tire; and Fig. 4 is a detail of a link employed with the device.

Referring to the drawings in detail, in which like reference characters designate corresponding parts throughout the several views, my improved tire shield is shown as comprising a plurality of sections 10 produced by cutting an old tire casing or shoe into a plurality of sections preferably of equal lengths, after said casing or shoe is no longer able to withstand the air pressure, said sections being provided with the usual clencher portions 11. The tire clencher irons or retaining devices for mounting the shield or sections thereof, are designated at 12 and are in the form of curved strips or sections of metal or other suitable rigid material, such as aluminum, sheet or cast malleable iron or the like with their end portions extended radially and flush with the ends of the sections 10, as particularly indicated in Fig. 1 of the drawings.

These retaining devices are of substantially the same cross-section as the clencher portions 11 but sufficiently large to provide therein, grooves 14 of similar cross section adapted to accommodate said clencher portions which are slid into position longitudinally from one end of each iron or section. That is, each retaining device has a straight and flat inner portion or face 15 and an outwardly directed outer portion 16 terminating in a flange 17 curved inwardly and adapted to conform to and overlie the bead of the clencher portion 11 of the section of the worn out tire casing or shoe forming the shield or armor. The portions 15 and 17 are spaced apart to provide slots 18 to accommodate the adjacent portions of the tire sections 10, thus firmly gripping the latter and rigidly retaining the same in position, even though the same may be worn, rim cut, or cracked. Each fastening member or iron 12 is provided with a closed end wall 19 and an open end 20, said closed end serving to limit the displacement of the section of the shield at its clencher portion 11, therein, in order that the ends of the shield sections and the retaining members or irons will be flush.

In order to assemble the device in position, the ends thereof are provided with apertures 21 adapted to receive bolts or other similar fastening means 22 for connecting the sections in spaced relation, through the medium of links 23. These links are apertured at their ends, one end of each being provided with a plurality of apertures 24 providing an adjustable connection by which the device may be made to apply to tires slightly varying in size or diameter. By having the sections spaced apart, the same will serve as traction lugs or anti-slipping and skidding elements to insure better grip or traction on the road or friction between the armor and the road surface in addition to allowing any mud or water which may enter between the tires and the sections of the shield, a way out, that is, so the same may escape at the ends thereof. In the drawings, and especially in Fig. 1, the device is shown applied to a tire 25 mounted on the rim 26 of a wheel 27. The inner faces of the flat portions 15 are preferably slightly offset inwardly but substantially in alinement with the inner edge of the curved clencher portion 17 of the retaining members or irons, thus securely holding the clencher portions of the section of tire forming the shield. The device will stop wear and tear on the new tire casing or shoe, will be instrumental to protecting the same against punctures and blowouts, and will insure greater mileage thereon.

Having thus described the invention what I claim is:

1. A tire shield comprising a plurality of sections consisting of a tire shoe or casing of substantially equal lengths having clencher portions, retaining members comprising curved sections of rigid material having flat inner portions and outwardly offset inwardly curved outer portions forming slots with said inner portions and grooves conforming to the shape of said clencher portions to receive the latter therein longitudinally, said retaining members each having one end closed, and adjustable links connecting said retaining members.

2. A tire shield comprising a plurality of sections, consisting of a tire shoe having clencher portions, retaining members formed of rigid material and having curved sections and flat inner portions, the flat inner portions adapted to engage a tire rim, the curved sections adapted to coöperate with the clencher portions to secure the shoe to a tire, and links having connection with the retaining members and adapted to closely engage the flat inner portions at the inner surfaces thereof to secure the sections together.

In testimony that I claim the foregoing as my own, I have hereto affixed my signature in the presence of two witnesses.

ALBERT TOKHEIM.

Witnesses:
CARL G. JOHNSON,
OLE TOKHEIM.